Feb. 9, 1954   J. F. HINES   2,668,335
LOCKING DEVICE FOR MOLDING FLASKS
Filed Oct. 6, 1950   6 Sheets-Sheet 1

INVENTOR.
JAMES F. HINES
BY
Bates, Teare, y McBean
ATTORNEYS

Feb. 9, 1954

J. F. HINES 2,668,335

LOCKING DEVICE FOR MOLDING FLASKS

Filed Oct. 6, 1950

6 Sheets-Sheet 2

INVENTOR.
JAMES F. HINES
BY
Bates, Teare, y M<sup>c</sup>Dean
ATTORNEYS

Feb. 9, 1954 J. F. HINES 2,668,335
LOCKING DEVICE FOR MOLDING FLASKS
Filed Oct. 6, 1950 6 Sheets-Sheet 3

INVENTOR.
JAMES F. HINES
BY
Bates, Teare, & McLean
ATTORNEYS

Feb. 9, 1954 J. F. HINES 2,668,335
LOCKING DEVICE FOR MOLDING FLASKS
Filed Oct. 6, 1950 6 Sheets-Sheet 4

INVENTOR.
JAMES F. HINES
BY
Bates, Teare, y McBean
Attorneys

Feb. 9, 1954 J. F. HINES 2,668,335
LOCKING DEVICE FOR MOLDING FLASKS
Filed Oct. 6, 1950 6 Sheets-Sheet 5

INVENTOR.
JAMES F. HINES
BY
Bates, Teare, & McBean
Attorneys

Feb. 9, 1954                  J. F. HINES                2,668,335

LOCKING DEVICE FOR MOLDING FLASKS

Filed Oct. 6, 1950                          6 Sheets-Sheet 6

INVENTOR.
JAMES F. HINES
BY
Bates, Teare, & McBean
Attorneys

Patented Feb. 9, 1954

2,668,335

UNITED STATES PATENT OFFICE 2,668,335

LOCKING DEVICE FOR MOLDING FLASKS

James F. Hines, Lakewood, Ohio, assignor, by mesne assignments, to Hines Flask Company, Cleveland, Ohio, a corporation of Ohio Application October 6, 1950, Serial No. 188,850

7 Claims. (Cl. 22—107)

This invention is concerned with a molder's flask of the type wherein the side panels, when in use, are held tightly together at the corners by manually operable clamps. Such clamps may release the corners sufficiently so that springs between the adjacent ends of the panels will separate the panels sufficiently to release the mold.

The present invention relates particularly to the clamp, and an object of the invention is to provide not only an effective clamp but means associated with the clamp for positively locking it in the position it has when the mold panels are clamped together for use, so that there shall be no danger of the clamp being inadvertently released during the formation of the mold for the casting operation.

A further feature of my clamping mechanism is that the locking action is effected automatically when the ends of the panels have been forced tightly together but may be readily released when desired. Such release of the lock may be effected by the operator's hand in the same position it has when moving the clamp to free the flask.

It is frequently desirable to increase the effective flask height by mounting one flask on top of another, and in that case my swinging clamp has a further advantage that it may be so mounted on the flask that the clamps of both flasks may be released simultaneously by a single hand of the operator.

My invention is hereinafter more fully described in connection with the accompanying drawings, and its essential novel characteristics are set out in the claims.

Figure 1:
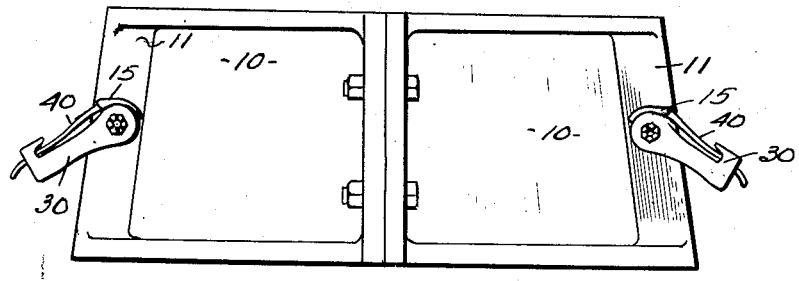
Figure 2:
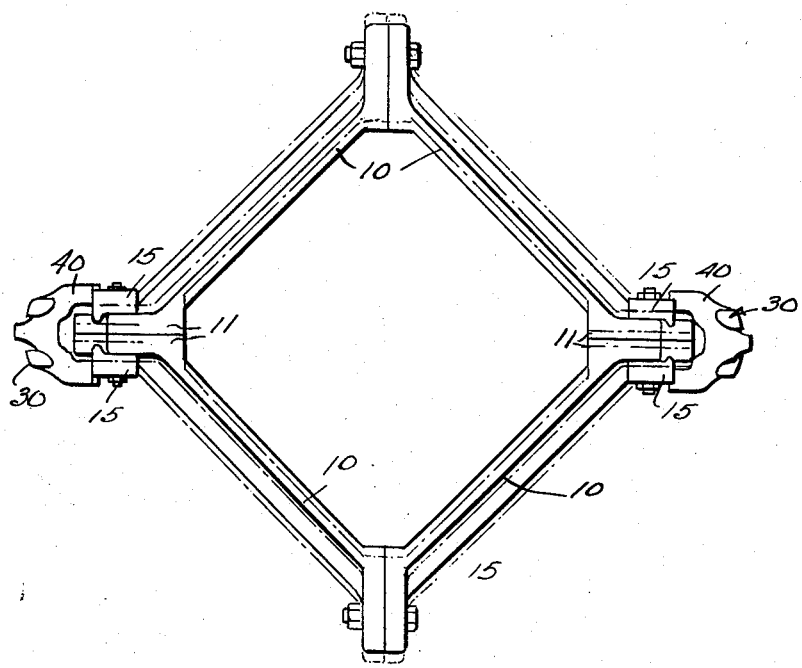
Figure 3:
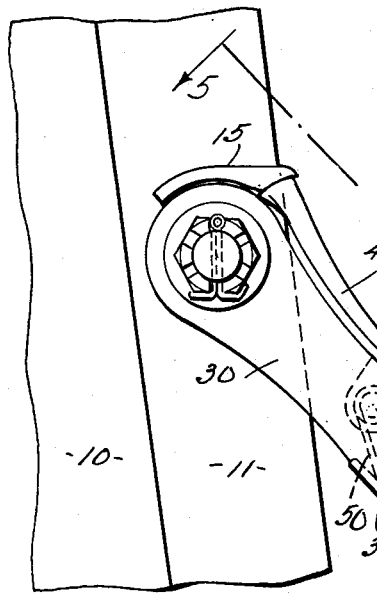
Figure 4:
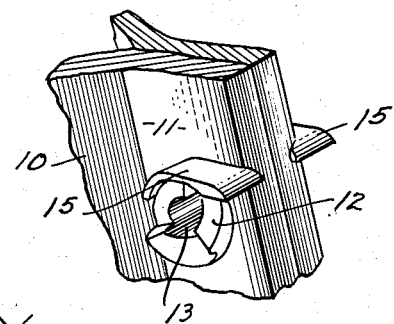
Figure 5:
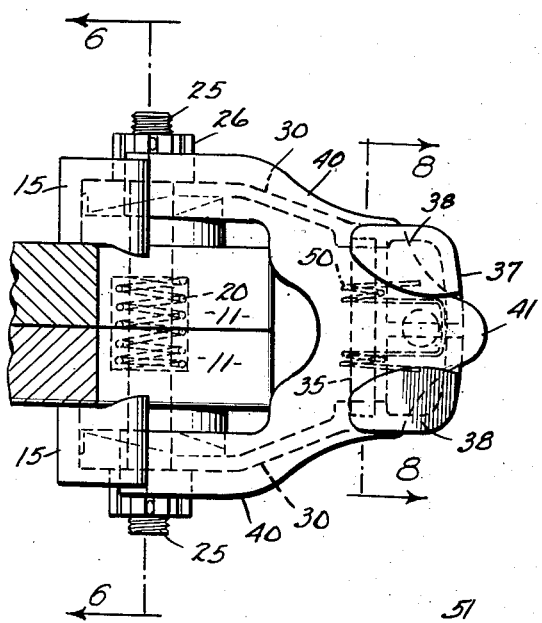
Figure 6:
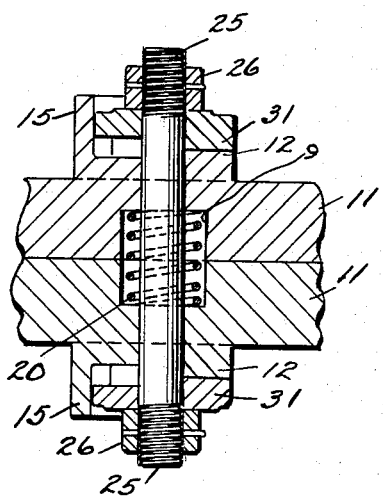
Figure 7:
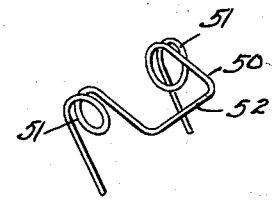
Figure 9:
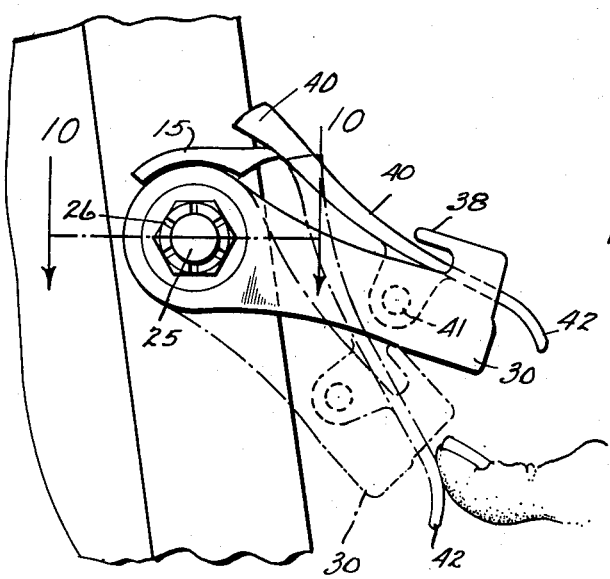
Figure 10:
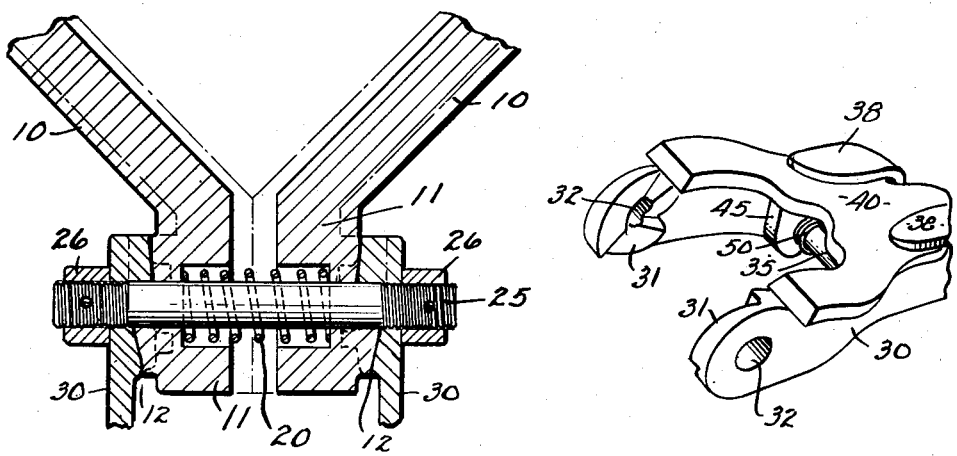
Figure 11:
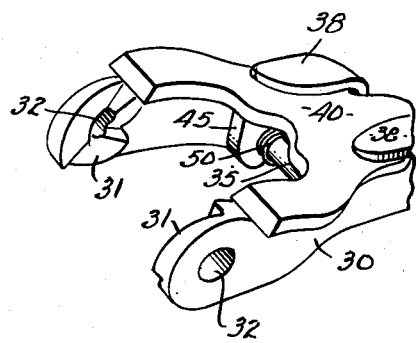
Figure 8:
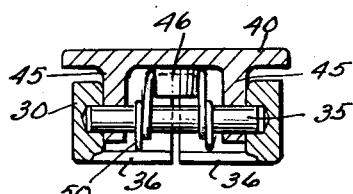
Figure 13:
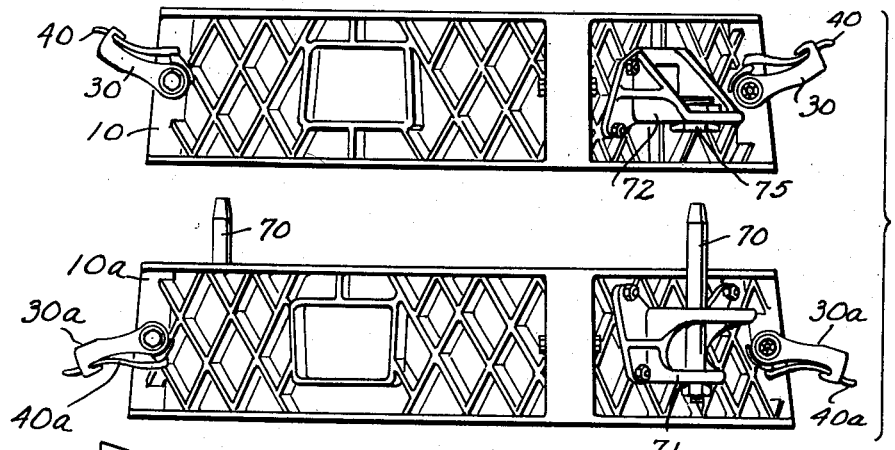
Figure 12:
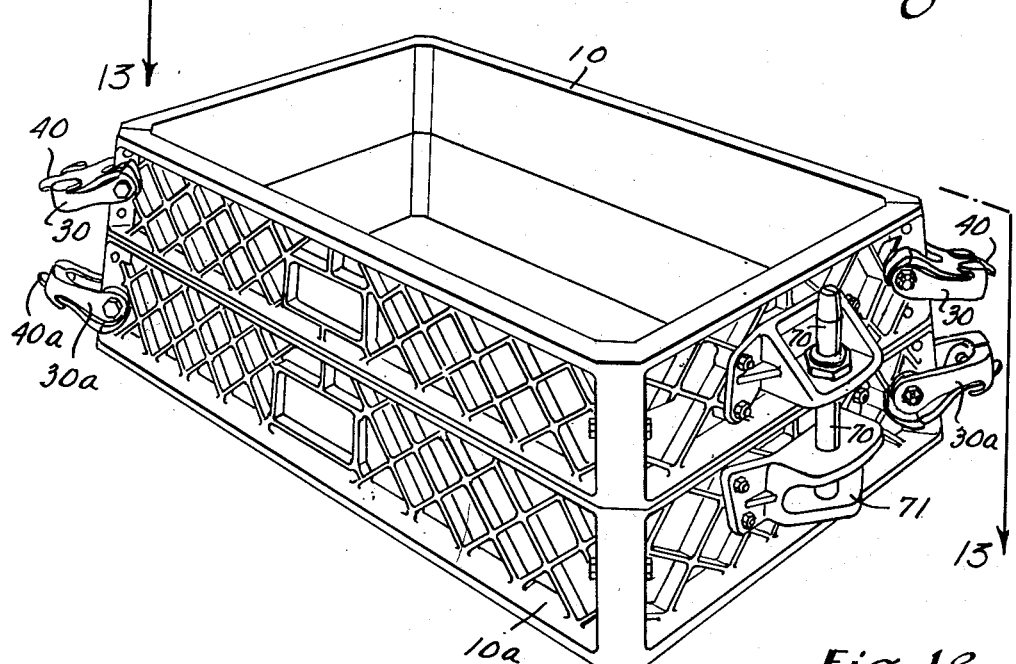
Figure 15:
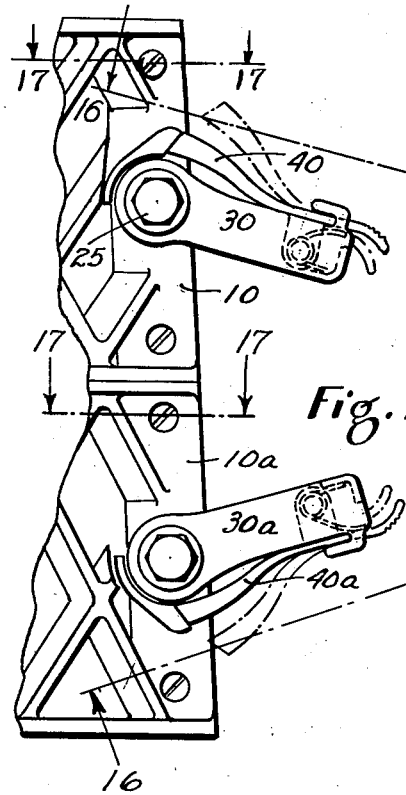
Figure 16:
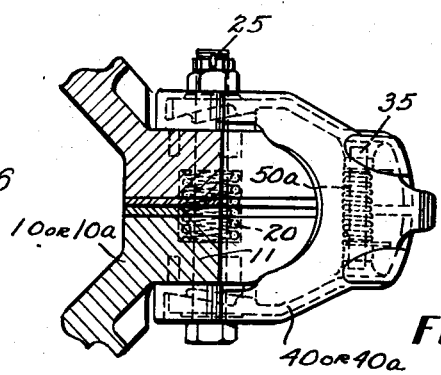
Figures 17, 18:
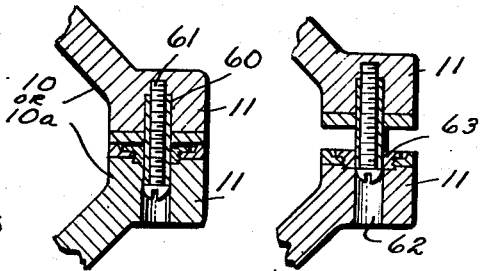
Figure 14:
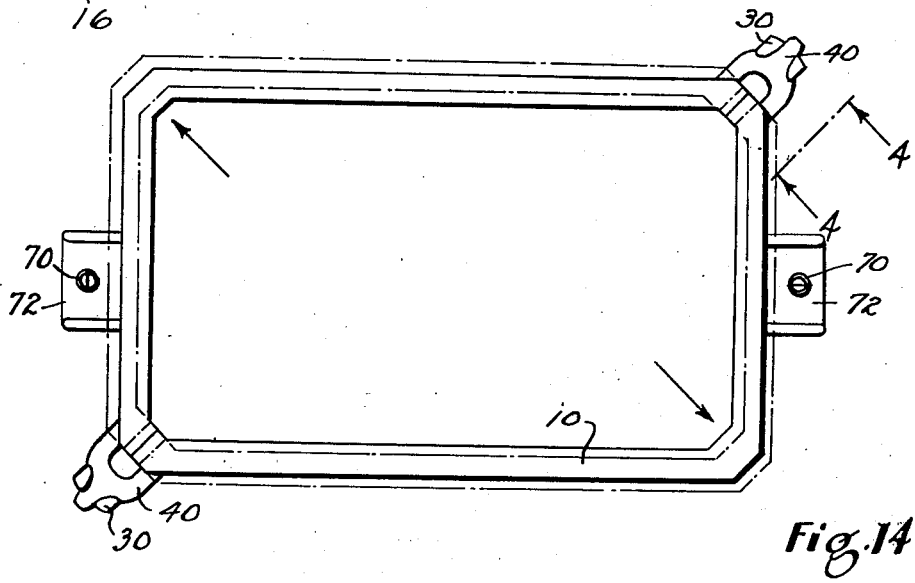
Figure 19:
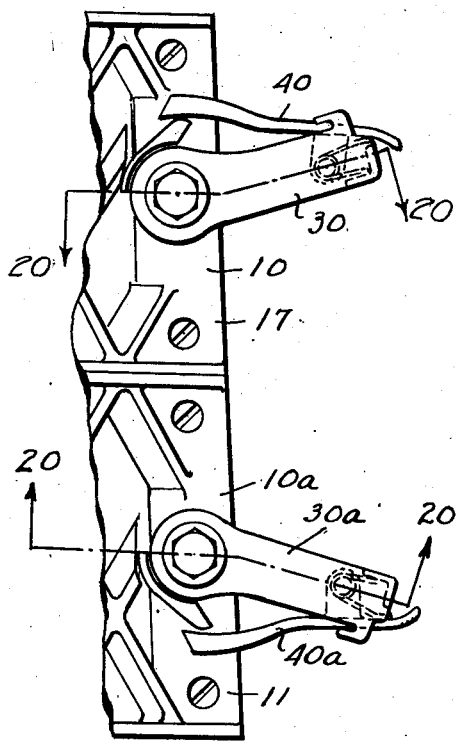
Figure 20:
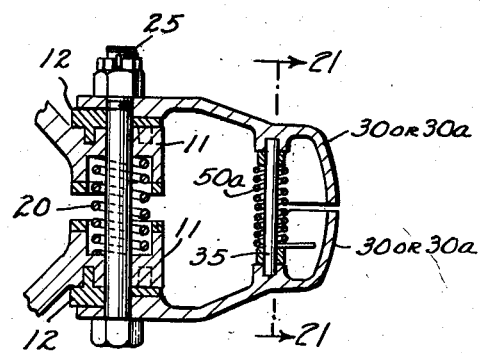
Figure 21:
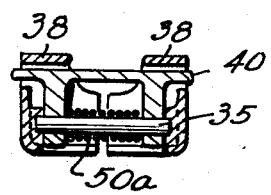
Figure 22:
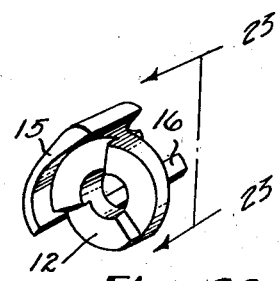
Figure 23:
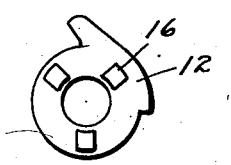

In the drawings, Fig. 1 is a side elevation of a flask embodying my invention and having my clamping device at four corners thereof; Fig. 2 is a plan of such flask, the broken lines indicating the open or releasing position thereof; Fig. 3 is a side elevation of one of the clamps, shown in its locked position on one of the corners of the flask; Fig. 4 is a perspective of a portion of the flask at one of the corners; Fig. 5 is a view of the clamp looking from the position indicated by the line 5—5 on Fig. 3, a portion of the flask being shown in section; Fig. 6 is a fragmentary section on the line 6—6 of Fig. 5; Fig. 7 is a perspective of a spring acting on the lever of the clamp; Fig. 8 is a cross section through the clamp, as indicated by the line 8—8 on Fig. 5; Fig. 9 is an edge view of the clamp showing it in full lines in its released position and in broken lines in the locked position; Fig. 10 is a horizontal section through adjacent corner portions of the flask, the plane of the section being indicated by the line 10—10 on Fig. 9; Fig. 11 is a perspective of a portion of the clamping lever; Fig. 12 is a perspective of two flasks, one surmounting the other, and each equipped with my clamps; Fig. 13 is an elevation looking at the corner of such pair of flasks, with the flasks separated and their clamps released; Fig. 14 is an illustrative plan of either of the flasks of Figs. 12 and 13; Fig. 15 is an elevation at one corner of the surmounting flasks, showing the clamps in locked position; Fig. 16 is a plan of the upper clamp or a bottom plan of the lower clamp in Fig. 15, as indicated by the lines 16—16 thereon; Fig. 17 is a detail in horizontal section through a meeting corner of a pair of flask panels as indicated by either of the lines 17—17 on Fig. 15; Fig. 18 is a view similar to Fig. 17, but showing the condition of the guide pins when the panels are separated by movement of the clamp to releasing position; Fig. 19 is an elevation similar to Fig. 15, but showing the clamps in released position; Fig. 20 is an approximately horizontal section through the clamp, as indicated by either of the lines 20—20 on Fig. 19; Fig. 21 is a detail in cross-section through the clamp, as indicated by the line 21—21 in Fig. 20; Fig. 22 is a perspective of one of the cams to be mounted on the flask and engaged by the locking lever; and Fig. 23 is an elevation of such cam looking from the opposite direction to Fig. 22.

As shown in the drawings, 10 indicates each of the side panels of a four-sided flask, each panel being equipped at its ends with wings 11 which extend outwardly at 45° to the general course of the panel. When the wings of adjacent panels abut each other the open rectangular frame shown in Fig. 2 is provided.

Each wing 11 has in its inner face a cylindrical recess 9, and set in the recess of adjacent wings is a helical compression spring 20 tending to separate the wings. The separation is limited by a bolt 25 passing through the wings and having nuts 26 on its ends. During the forming of the mold and the casting operation, however, the wings are held tightly together, as shown in Figs. 5 and 6, by my clamp, which will now be described.

On the outer side of each wing 11, I provide a face cam 12 arranged in a course about the opening 13 through which the bolt extends. The cam preferably has several inclined arcuate faces, as shown in Fig. 4, and is surmounted by an arcuate ledge 15 carried by the wing 11 forming a shield over the cam to protect it from sand which may inadvertently fall in loading the flask.

The cam and ledge are preferably made as a unit independently of the flask and are provided with lugs 16 which enter corresponding openings in the flask wings, as shown in Figs. 22 and 23. If desired, the cam unit may be first mounted in the mold for the flask panel and the panel cast with that portion against the back face of the cam and enclosing the lugs.

The clamping lever is a bifurcated member 30 having on the inner face of its arms face cams 31 which are complementary to the flask cams 12. These cams 31 surround openings 32 in the lever arms. The bolt 25, which extends through the wings and within the spring 20 and projects outwardly through the stationary cams 12, also passes through the cams 31 on the lever, and the nuts 26 lie outside of the lever arms.

The clamping lever 30, it will be seen, is pivoted coaxially with the cams, hence, when such lever is swung on such pivot its cams 31 act on the flask cams 12 and may thus hold the flask members tightly shut, as shown in Figs. 5 and 6. Such clamped position, which is shown in Fig. 3, is the normal position of the clamp, holding the flask in condition for molding, as shown in Fig. 2.

I provide a latch to lock the lever 30 normally in clamping position. As shown, the latch lever 40 is pivoted at 41 to a lever 30 and has its free end adapted to engage a shoulder on the flask. This shoulder may be the end of the arcuate sand shield 15.

The latch 40 has a portion 42 projecting downwardly beyond its pivot and forming a thumb portion, whereby the lever may be readily swung to raise its upper end to the broken line position in Fig. 9. This frees the latch from the ledge 15 and allows the whole lever with the latch to be swung into the upper position, shown in full lines in Fig. 9, thus releasing the clamp and allowing the spring 20 to separate the panels, as shown in Fig. 10.

I prefer to make the lever 30 in the form of two separate members connected by a cross pin 35. The latch 40 has downwardly extending ears 45 embracing this pin and thus pivoting the latch to the lever. The two portions of the lever 30 each have adjacent their outer ends inwardly extending bottom portions 36, and a spring between such bottom portions and the latch lever tends to hold the latter in engaged position shown in Fig. 3.

The spring may conveniently be of the form shown at 50 in Figs. 5, 7, 8 and 11, or it may have the helical form shown at 50A in Fig. 16. The spring of either form surrounds the pin 35 and has projecting portions bearing respectively against a bottom ledge 36 of the lever 30 and against the under side of the latch lever 40. If the spring is of the form shown in Fig. 5, one of its projecting portions may be intermediately locked and embrace a lug 46 on the latch lever.

I prefer to give the outer end of the two-part lever 30 a sort of box-like form composed of the bottom ledges 36, inwardly extending end portions 37 and top lips 38. This forms a protective shield for the operator's hand in manipulating the clamp.

In forcing the clamp to active position the operator presses on the lips 38 until the latch lever clears the ends of the ledges 15 on the panel wings, whereupon the spring causes the free end of the latch lever 40 to swing into locking position. Thereafter, to release the clamp, the operator merely presses against the end portion 42 of the latch lever to release it and then swings the entire clamp into releasing position. This may be conveniently done by the operator with one hand grasping the device between his thumb and fingers and by a squeezing movement release the latch and swing the lever.

Fig. 2 indicates the normal operating condition of a flask having my clamps. In this view, I have shown the camming clamps at only two opposite corners, the other two corners being rigidly connected by bolts. This reduces the cost of the flask. However, if desired, clamps may be supplied at all four corners.

It is convenient to provide the flask panels with guide pins and corresponding recesses in the meeting wings to insure accurate positioning of such wings. A preferred form of such pins is illustrated in Figs. 17 and 18. A short tube 60 is set into a recess in one of the wings and clamped therein by a screw 61 passing through the tube and threaded into the wing. This tube forms a smooth guiding pin which may enter a recess of corresponding diameter in the other wing. As shown in Figs. 17 and 18, such recess 62 extends clear through such other wing and may have its entrance portion accurately defined by a washer 63 threaded into the face of the wing.

In Figs. 12 to 19, I have illustrated the preferred mounting of the clamps when one flask is to be placed on top of another. Thus in these views I locate the clamps of the upper flask just as they are for the single flask shown in Figs. 1 to 9, but on the lower flask, here indicated at 10A, I mount the clamp (indicated at 30A) inverted from the position heretofore described. The clamp 30A is, therefore, set by upward movement and the latch is released by an upward movement on the tail of the latch, this being in contradistinction to the downward movement at the upper flask. The result is that when the flasks are mounted one on the other, the operator may grasp both clamps with a single hand and press each toward the other to release the clamp.

In case of surmounting flasks, it is desirable to provide vertical guides to insure accurate registration. Such guides are shown in Figs. 12 and 13 as vertical pins 70 carried by brackets 71 secured to the ends of the under flask and adapted to project upwardly through brackets 72 carried by the upper flask. I find it very efficient to make the brackets 71 with two spaced flanges one above the other so that the pin extending through the upper flange and clamped by a nut to the lower flange will be definitely held in vertical position. If desired, the hole in the upper bracket 72 for receiving the pin may be accurately defined by a bushing 75 screwing into a plate-like portion of the bracket, as shown in Fig. 13.

It will be seen that with an expansible flask equipped with my locking clamps, the flask may be used as a solid unit in the forming of the mold and pouring the casting in the ordinary manner, without any possibility of the flask panels being forced apart. Thereafter the release of the latches and the swinging of the clamp levers is very easily and quickly effected to cause the flask panels to separate themselves from the mold. The same finger movement that releases the latch may also swing the cam lever. In the case of surmounting flasks the release and the swinging of two clamps may be simultaneously effected by one hand of the operator.

I claim:

1. The combination of a pair of panels, the panels being provided with abutting wings extending outwardly at the adjacent ends of the panels to form a common corner, said wings adapted to meet on their inner faces, cams on the outer faces of the wings, a bifurcated clamping lever extending onto opposite outer sides of said wings and having cams on its inner faces coacting in one position of the lever with those of the wings on a common transverse axis through the wings to clamp the wings together, means for pivoting the lever to the wings at the common axis, a shoulder carried by a wing, and a latch carried by the clamping lever external of the common corner and extending towards engagement with the shoulder when the clamp is in its active position.

2. A flask composed of a set of panels each having abutting wings at its ends extending outwardly at 45° to form a common flask corner, springs between the wings of adjacent panels tending to separate such panels, cams on the outer faces of said wings, a bifurcated clamping lever having arms extending onto the outer faces of said wings, cams on the inner faces of said arms coacting in one position of the lever with the cams on the wings on a common transverse axis through the wings to clamp the wings together, a bolt passing through the wings and all of said cams for pivoting the lever to the wings at the common axis, shoulders carried by the outer faces of said wings, a bifurcated latch lever pivotally carried by the clamping lever external of the common flask corner and extending into engagement with said shoulders to hold the clamp in its locked position, and a spring coacting between the clamping lever and the latch lever on the side of the latch lever pivot opposite the common flask corner and tending to hold the latch lever in position to engage said shoulders.

3. The combination, with a pair of members to be clamped together in abutting relation at their ends, of clamping means including an operating lever pivoted at one end to the members on a common transverse axis through the abutting ends of said members, means coacting along the common axis and against the abutting ends respectively with the operating lever in one position to clamp said ends together, one of the members having a projecting ledge adjacent the pivotal end of the lever, a latch lever pivotally carried by the operating lever external to the abutting ends of the members and having one end extending towards engagement with the ledge when the clamp is in its active position and adapted to ride on top of the ledge when the clamp is idle, and means for maintaining the latch lever in engagement with the projecting ledge when the clamp is active.

4. The combination, with a pair of members to be clamped together in abutting relation, of clamping means including an operating lever pivoted at one end to the members on a common transverse axis through abutting ends of said members, means coacting along the common axis and against the abutting ends respectively with the operating lever in one position to clamp said ends together one of the members having a projecting ledge overlying the pivotal axis of the lever, and a latch lever pivotally carried by the operating lever external to the abutting ends of the members and having one end extending towards engagement with the under surface of the ledge when the clamp is in its active position, the other end of said latch lever extending outwardly beyond the lever pivot adjacent a corresponding end of said operating lever to provide a finger-operating portion and a spring coacting between said outwardly extended latch and operating lever ends to maintain the engagement of the latch lever with the projecting ledge, said latch lever being movable on its pivot to clear the ledge and release the operating lever clamp.

5. The combination, with a pair of members to be clamped together at mating ends, of an externally accessible bifurcated lever having arms extending onto opposite sides of the mating ends of said members and pivoted thereto on a common transverse axis through the mating ends, means positioned by the lever for coaction along the common axis and against the respective mating ends for clamping the members together, said operating lever being formed at its outer end with a housing opening toward the pivot of the lever, a bifurcated latch lever pivoted to the operating lever external to said mating panel ends and having one end extending towards said operating lever pivot, a spring within said housing acting on the other end of the latch lever to move its extended end toward the pivot of the operating lever, and shoulders on the outer sides of the mating ends of said members adapted to be abuttingly engaged by the latch lever when the operating lever is in clamping position, said latch lever being movable against the action of said spring to clear said shoulders, whereupon the operating lever may be moved to idle position.

6. The combination of a pair of flask panels having mating ends meeting at a corner, clamping means therefor, including a bifurcated operating lever pivoted at one end to the panels at a common axis through the mating ends, means coacting along the common axis and against the abutting ends respectively with the operating lever in one position to clamp said ends together, a latch lever intermediately pivoted to the operating lever external to the flask corner and having its forward arm extending towards engagement with a shoulder on one of the panels, said operating lever having a pair of spaced flanges extending freely over the rear arm of the latch lever with said rear arm accessible between them, and a spring coacting between said operating lever and the rear arm of said latch lever to swing the forward arm of the latch lever toward the operating lever and into engagement with the panel shoulders.

7. The combination of a pair of flasks one adapted to be mounted on top of the other with corresponding corners in aligned relation to form respective common flask corners, each flask formed from panels having adjacent ends abutting each other at the corresponding flask corners, a clamping means for each flask for clamping the abutting ends of the corresponding panels together and each located at a common corner of the two flasks, each clamping means having an operating lever extending outwardly from the common corner in inverted operating relation to each other, an external accessible spring latch carried by each operating lever and extending towards the common flask corner for engagement with a shoulder on the corresponding flask, the latch on the upper clamp being releasable by a downward movement and the latch on the lower clamp being releasable by upward movement, said latches being close enough together so that they may be actuated simultaneously by a single hand of the operator.

JAMES F. HINES.

References Cited in the file of this patent

UNITED STATES PATENTS

| Number | Name | Date |
|---|---|---|
| 1,514,319 | Janney | Nov. 4, 1924 |
| 1,714,200 | Wells | May 21, 1929 |
| 2,272,707 | Hines | Feb. 10, 1942 |
| 2,289,269 | Hines | July 7, 1942 |
| 2,498,015 | Street | Feb. 21, 1950 |